United States Patent Office 3,703,544
Patented Nov. 21, 1972

3,703,544
PROCESS FOR PREPARING THE TRIS(HYDROXYMETHYL)-AMINOMETHANE SALT OF PGE$_2$
Walter Morozowich, Kalamazoo, Mich., assignor to The Upjohn Company, Kalamazoo, Mich.
No Drawing. Continuation-in-part of application Ser. No. 42,458, June 1, 1970. This application May 10, 1971, Ser. No. 142,019
Int. Cl. C07c 91/02
U.S. Cl. 260—501.17          3 Claims

ABSTRACT OF THE DISCLOSURE

Free flowing crystals of the tris(hydroxymethyl)aminomethane salts of PGE$_2$ and PGF$_{2\alpha}$, and processes for producing those, are disclosed. Those crystals are useful for the same pharmacological and medical purposes as PGE$_2$ and PGF$_{2\alpha}$, and are also useful as a means for purifying PGE$_2$ and PGF$_{2\alpha}$.

CROSS REFERENCE TO RELATED APPLICATION

This application is a continuation-in-part of my copending application Ser. No. 42,548, filed June 1, 1970 now Pat. No. 3,657,327.

DESCRIPTION OF THE INVENTION

This invention relates to novel manufactures and to novel methods for producing those. In particular, this invention relates to free flowing crystals of the tris(hydroxymethyl)aminomethane salt of a compound of the formula:

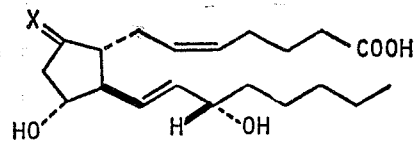

wherein X is =O or

and to methods for making those crystals.

The compound of Formula I wherein X is =O is an optically active compound known as prostaglandin E$_2$ (PGE$_2$). The compound of Formula I wherein X is

is an optically active compound known as prostaglandin F$_{2\alpha}$ (PGF$_{2\alpha}$). These compounds are known to be useful for a variety of pharmacological and medical purposes, for example, labor induction and abortion in pregnant animals, including humans, and menstrual regulation in both pregnant and non-pregant animals, including humans. For these purposes, the usual route of administration is intravenous injection or infusion, although the oral route is also used in labor induction and the vaginal and intrauterine routes are also used for abortion and menstrual regulation.

It is difficult to formulate these Formula I carboxylic acids into compositions suitable for pharmacological and medical uses. For example, they do not dissolve readily in water or in the isotonic solutions necessary for intravenous injection or infusion. Preliminary treatment of the prostaglandin with a water-miscible organic solvent and/or an aqueous solution of a base, for example, sodium hydroxide or sodium carbonate, is usually necessary before an isotonic aqueous solution of the proper concentration can be formed. Moreover, PGF$_{2\alpha}$ is a low-melting waxy solid which is difficult to solidify and purify, and which is slow in dissolving in aqueous base solutions. Although PGE$_2$ is a crystalline solid, it also is waxy and slow to dissolve in aqueous base solutions.

PGE$_2$ and PGF$_{2\alpha}$ are carboxylic acids, and salt formation is involved when PGE$_2$ or PGF$_{2\alpha}$ is dissolved in aqueous base solutions as a preliminary step in the known formulation procedures. See also British specification 1,040,544 where pharmacological and medical use of PGE$_2$ and PGF$_{2\alpha}$ in pharmacologically acceptable salt form is suggested. Among the pharmacologically acceptable cations suggested there are those derived from the alkali and alkaline earth metals, ammonia, and various amines.

There would be substantial advantage in having available PGE$_2$ and PGF$_{2\alpha}$ each in the form of a stable, crystalline, high-melting salt which is rapidly soluble in water or in the isotonic solutions necessary for intravenous administration. These salts would also be useful in formulations intended for other routes of administration, for example, oral, buccal, intravaginal, and intrauterine. There would also be substantial advantage in being able to recrystallize those same salts to produce preparations of the desired degree of purity. This would be especially desirable for PGF$_{2\alpha}$, which, as mentioned above, is difficult to purify as a free acid.

I have now made the surprising and unexpected discovery that free-flowing crystals of the tris(hydroxymethyl)aminomethane salts of PGE$_2$ and PGF$_{2\alpha}$ are produced by mixing a dilute acetonitrile solution of the prostaglandin in the range 65° to 85° C. with a concentrated aqueous solution of an equivalent amount of tris(hydroxymethyl)aminomethane, cooling the resulting mixture to the range 20° to 30° C., maintaining the mixture in the range 20° to 30° C. until crystals are formed, and collecting said crystals. These free flowing salt crystals are non-hygroscopic, easily dried, free of water and acetonitrile solvate molecules, and recrystallizable. They also dissolve rapidly and completely in water and in the usual isotonic solutions used for intravenous injection or infusion, and are useful for the same pharmacological and medical purposes as PGE$_2$ and PGF$_{2\alpha}$.

In carrying out this novel process, it is desirable to use equivalent amounts of the prostaglandin and the tris(hydroxymethyl)aminomethane. The latter is rather insoluble in acetonitrile and an excess will precipitate with and contaminate the desired salt. Using less than an equivalent amount of the amine will result in part of the prostaglandin staying in the acetonitrile.

As mentioned abve, the salt formation and crystallization occur in a mixture of acetonitrile and water. It is important that the proportions of acetonitrile and water be such that the maximum amount of salt crystallizes from the solvent mixture. Enough water must be used, of course, to form and transfer a homogeneous solution of tris(hydroxymethyl)aminomethane to the acetonitrile solution of the prostaglandin. But use of water substantially above that minimum amount will require use of excessive amounts of acetonitrile. For each volume of water about 100 to 200 volumes of acetonitrile should be used. Use of substantially less acetonitrile will result in a mixture of acetonitrile and water which will unnecessarily retain the desired salt in solution. Use of larger amounts of acetonitrile would be unnecessary and wasteful of the acetonitrile. A convenient and suitable amount of water is about 3 milliliters per gram of tris(hydroxymethyl)aminomethane. Not much less can be used because of the solubility of that amine in water (about 0.5 gram per ml. at 25° C.). Use of more water will require excessive amounts of acetonitrile.

The acetonitrile solution of the prostaglandin should be in the range 65° to 85° C. when it is mixed with the aqueous tris(hydroxymethyl)aminomethane solution. It it advantageous to heat the acetonitrile solution to about its boiling point, i.e., about 80° C. at atmospheric pressure. To minimize degradation of the prostaglandin, heating should be rapid and mixing with the aqueous amine solution should be done promptly when the acetonitrile solution is at the desired temperature. It is advantageous though not necessary to warm the aqueous amine solution to the range 50° to 80° C. before mixing.

The aqueous amine solution is advantageously added slowly and with vigorous stirring to the hot acetonitrile solution. The resulting hot mixture is then cooled to room temperature (about 20° to 30° C.).

When this process is first carried out, it is advantageous to do it in a glass vessel, the inner walls of the vessel being scratched vigorously with a glass rod when the mixture just starts to become cloudy. Doing that will hasten crystal formation. In subsequent operations, a few crystals from this first crystallization can be added as seeds at the same point of initial clouding to hasten crystal formation, and a glass vessel need not be used.

After this initial cooling, the mixture is maintained at room temperature (about 20° to 30° C.) until no further crystallization occurs. The crystals are then collected by conventional techniques, e.g., filtration or centrifugation, and washed with a small amount of acetonitrile. Most of the acetonitrile is removed either under reduced pressure or in a current of warm nitrogen or argon. The crystals are then ground to a finer particle size if desired, and drying is completed by heating in the range 50° to 75° C.

When recrystallization of the tris(hydroxymethyl)aminomethane salt of $PGE_2$ or $PGF_{2\alpha}$ is desired, that is advantageously done by dissolving the salt in a small amount of water (1. to 3 ml. of water per g. of salt), adding that solution with vigorous stirring to hot acetonitrile (65° to 85° C.; about 200 ml. per g. of salt), and cooling the resulting mixture to room temperature (20° to 30° C.), advantageously adding a few crystals at the cloud point to assure prompt crystallization. The crystals are collected, washed, and dried as above.

I have also made the surprising and unexpected discovery that free flowing crystals of the tris(hydroxymethyl/aminomethane salt of $PGE_2$ are also produced by a process which comprises the steps, (1) mixing a concentrated solution of equivalent amounts of $PGE_2$ and tris(hydroxymethyl)aminomethane in a water-miscible, polar, normally liquid organic compound below about 40° C. with sufficient of a less polar, normally liquid organic compound miscible with said polar compound to cause at least part of said salt to precipitate in the range −20° to 40° C., (2) maintaining the resulting mixture in the range −20° to 40° C. until crystals have formed, and (3) collecting said crystals.

This is a preferred process for producing this free flowing crystalline salt of $PGE_2$.

In this preferred process, the term "normally liquid" means a compound which is a liquid at 40° C. and under one atmosphere of pressure (760 mm. of mercury). Examples of suitable water-miscible, polar, normally liquid organic compounds are dimethyl sulfoxide, dimethylformamide, tetramethylurea, sulfolane (tetramethylene sulfone or tetrahydrothiophene-1,1-dioxide), and methanol. Especially preferred is dimethyl sulfoxide.

Examples of suitable less polar, normally liquid organic compounds miscible with said polar compound are acetonitrile, propionitrile, butyronitrile, dichloromethane, methyl propyl ketone, diethyl ether, and chloroform. Nitriles are preferred less polar compounds in this process, especially acetonitrile.

An especially preferred combination of polar and less polar compounds is dimethyl sulfoxide and acetonitrile, respectively.

As for the previous novel process, in this second and preferred novel process also, it is desirable to use equivalent amounts of $PGE_2$ and the tris(hydroxymethyl)aminoethane.

In this second novel process, the salt formation occurs when the $PGE_2$ and the tris(hydroxymethyl)aminomethane are mixed together to form a solution in the water-miscible, polar, normally liquid organic compound. Said salt is then caused to precipitate in the form of the desired free flowing crystals by addition of sufficient of the less polar compound to said solution and maintaining the resulting mixture in the above-mentioned temperature range of −20° to 40° C. It is desirable that the minimum amount of the polar compound be used to form and dissolve the $PGE_2$ and tris(hydroxymethyl)aminomethane and the resulting salt. Since this amount of polar compound is quite small in some instances, it is advantageous in those instances to have also present a small amount of the intended less polar compound at the time the $PGE_2$ and tris(hydroxymethyl)aminomethane are first mixed. Then, sufficient additional nonpolar compound is added to cause the desired precipitation.

As for the first process, also in this second preferred process, it is advantageous to carry out the process the first time in a glass vessel, the inner walls being scratched vigorously with a glass rod while step 2 is being carried out. Doing that tends to hasten crystal formation. In subsequent operations, a few crystals from the first crystallization can be added as seeds at the same point in the process to hasten crystal formation, and a glass vessel is not needed.

The amount of less polar compound necessary to cause precipitation of the free flowing crystalline salt will vary somewhat according to the combination of the particular polar compound and less polar compound that is used. The appearance of turbidity during addition of the less polar compound is a useful indication that the minimum amount of the less polar compound has been added. Additional less polar compound beyond this amount is usually necessary, the exact total amount to be used being easily determined by one of ordinary skill in this art. Use of an excessive amount of less polar compound will result in an oily salt rather than a crystalline salt.

Although satisfactory results in this second process are usually obtained by carrying out the entire process in the range of 20° to 30° C., there is frequently advantage in cooling during the second step of the process below 20°, preferably down to 0° C. or even as low as −20° C., and then allowing the cooled mixture to warm slowly to the range 20° to 30° C. Doing this at least once and in some cases two or more times tends to hasten the crystallization.

When crystal formation is complete, the salt is collected, washed, and dried as described above for the first process.

When recrystallization of the tris(hydroxymethyl)-aminomethane salt of $PGE_2$ is desired, a preferred manner of doing that is by solution of said salt in a minimum of one of the polar liquids mentioned above, preferably dimethyl sulfoxide, and then addition of sufficient of one of the less polar liquids mentioned above, preferably acetonitrile, to cause precipitation of the free flowing crystalline salt in the range −20° to 40° C. The crystals are collected, washed, and dried as described above.

It is advantageous although not essential to carry out all of the above operations, both first and second processes, with minimum exposure to oxygen by replacing air with an inert gas, for example, nitrogen or argon.

When recovery of $PGE_2$ or $PGF_{2\alpha}$ from their respective tris(hydroxymethyl)aminomethane salts is desired, that is accomplished by disolving the salt in water (10 ml. per g. of salt), adjusting the pH of that solution to the range 6 to 7, and extracting the solution repeatedly with ethyl acetate. The ethyl acetate extracts are combined, washed successively with water and saturated aqueous sodium chloride solution, dried, and evaporated to give $PGE_2$ or $PGF_{2\alpha}$.

The invention can be more fully understood by the following examples:

EXAMPLE 1

*Free flowing crystals of the tris(hydroxymethyl)-aminomethane salt of $PGF_{2a}$*

A solution of tris(hydroxymethyl)aminomethane (1.645 g.) in 3.0 ml. of water at 60° C. is added with vigorous stirring to a solution of $PGF_{2a}$ (5.00 g.) in 700 ml. of acetonitrile which has just been brought to its boiling point. The vessel which contained the aqueous amine solution is rinsed with three 0.66-ml. portions of water, each rinsing being added with vigorous stirring to the acetonitrile solution. The mixture is then cooled to about 55° C. by immersion of the vessel in cool water, and then to 25° C. under ambient conditions. At the cloud point (about 50° C.), the vessel wall (glass) below the liquid surface is scratched vigorously with a glass rod. The mixture is then maintained at 25° C. for 12 hours. The resulting crystals are collected by filtration under nitrogen, washed on the filter with 50 ml. of acetonitrile, and then dried by passing nitrogen at 50° C. through the filter cake for one hour. Drying is completed in an oven at 70° C. for 2 hours to give 5.965 g. of the tris-(hydroxymethyl)aminomethane salt of $PGF_{2a}$ in free flowing crystalline form; M.P. 100–101° C.

Following the procedure of Example 1 but using a few crystals of the product of Example 1 in place of scratching with a glass rod, the same salt in free flowing crystalline form and with the same melting point is obtained.

EXAMPLE 2

*Free flowing crystals of the tris(hydroxymethyl)-aminomethane salt of $PGF_2$*

Following the procedure of Example 1 but using $PGE_2$ in place of $PGF_{2a}$, free flowing crystals of the tris(hydroxymethyl)aminomethane salt of $PGE_2$ are obtained.

EXAMPLE 3

*Free flowing crystals of the tris(hydroxymethyl)-aminomethane salt of $PGF_2$*

A solution of tris(hydroxymethyl)aminomethane (36.5 mg.) in 0.4 ml. of dimethyl sulfoxide is added to a solution of $PGE_2$ (116 mg.) in one ml. of acetonitrile at 25° C. Acetonitrile (3 ml.) is added gradually to this mixture with stirring. At this point, the mixture is slightly turbid. Then, additional acetonitrile (15 ml.) is added with stirring, and the mixture is cooled to 0° C. and then allowed to warm slowly to 25° C. The flocculant, free flowing crystals which form are separated from the mixture by pressure filtration (nitrogen), washed on the filter with acetonitrile, and then dried by passing nitrogen through the filter cake at 25° C. for 15 minutes. Drying is completed under reduced pressure at 30° C. for 24 hours to give 80 mg. of the tris(hydroxymethyl)aminomethane salt of $PGE_2$ in free flowing crystalline form; $R_f$ 0.3—TLC—EtOAc+3% HOAc.

Following the procedure of Example 3 but using separately, dimethylformamide, methanol, and tetramethylurea in place of the dimethyl sulfoxide, the same free flowing crystalline salt is obtained.

Also following the procedure of Example 3 but using separately, methyl propyl ketone, diethyl ether, chloroform, dichloromethane, and butyronitrile in place of the acetonitrile, the same free flowing crystalline salt is obtained.

EXAMPLE 4

*Free flowing crystals of the tris(hydroxymethyl) aminomethane salt of $PGE_2$*

Tris(hydroxymethyl)aminomethane (48.4 mg.) is added with stirring to a solution of $PGE_2$ (140.8 mg.) in 0.8 ml. of dimethylformamide. Acetonitrile (150 ml.) is added gradually to the resulting solution with stirring at 25° C. The mixture is then maintained at 25° C. for 24 hours under nitrogen. The crystals which formed are separated, washed, and dried as described in Example 3 to give 50 mg. of the tris(hydroxymethyl)aminomethane salt of $PGE_2$ in free flowing crystalline form; M.P. 94.2–95° C.

Following the procedure of Example 4 but using sulfolane in place of the dimethylformamide, the same free flowing crystalline salt is obtained.

I claim:

1. A process for producing free flowing crystals of the tris (hydroxymethyl)aminomethane salt of $PGE_2$ which comprises the steps, (1) mixing a concentrated solution of equivalent amounts of $PGE_2$ and tris(hydroxymethyl) aminomethane in a first solvent selected from the group consisting of dimethyl sulfoxide, dimethylformamide, tetramethylurea, sulfolane, and methanol below about 40° C. with sufficient second solvent selected from the group consisting of acetonitrile, propionitrile, butyronitrile, dichloromethane, methyl propyl ketone, diethyl ether and chloroform to cause at least part of said salt to precipitate in the range −20° to 40° C., (2) maintaining the resulting mixture in the range −20° to 40° C. until crystals have formed, and (3) collecting said crystals.

2. A process according to claim 1 wherein said second solvent is acetonitrile.

3. A process according to claim 2 wherein said first solvent is dimethyl sulfoxide.

References Cited

UNITED STATES PATENTS

| | | | |
|---|---|---|---|
| 3,657,327 | 4/1972 | Morozowich | 260—501.17 |
| 3,598,858 | 8/1971 | Bergstrom et al. | 260—468 |

LEON ZITVER, Primary Examiner

M. W. GLYNN, Assistant Examiner